United States Patent
Friman

(10) Patent No.: US 6,594,507 B1
(45) Date of Patent: Jul. 15, 2003

(54) METHOD FOR ALLOCATING CHANNELS

(75) Inventor: Leif Friman, Järvenpää (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/603,936

(22) Filed: Jun. 27, 2000

Related U.S. Application Data

(63) Continuation of application No. PCT/FI99/00003, filed on Jan. 4, 1999.

(30) Foreign Application Priority Data

Jan. 5, 1998 (FI) .................................................. 980016

(51) Int. Cl.$^7$ ............................................... H04Q 7/00
(52) U.S. Cl. ..................... 455/560; 455/436; 455/445; 455/450; 370/328; 370/435; 370/336
(58) Field of Search .................. 455/436, 439, 455/445, 450, 560, 561, 451, 452, 524, 501, 427–428, 430; 370/328, 330, 331, 332, 336, 468, 344, 341, 436, 401–402, 410, 325, 323, 427–430, 465–467; 709/230, 237–238, 206–208, 221–223

(56) References Cited

U.S. PATENT DOCUMENTS

| | | | | |
|---|---|---|---|---|
| 5,526,397 A | * | 6/1996 | Lohman | 455/560 |
| 5,644,570 A | | 7/1997 | Skalsky | |
| 5,734,979 A | * | 3/1998 | Lu et al. | 455/428 |
| 5,771,452 A | * | 6/1998 | Hanley et al. | 455/445 |
| 5,828,666 A | * | 10/1998 | Focsaneanu et al. | 370/389 |
| 5,898,696 A | * | 4/1999 | Proctor et al. | 370/468 |
| 5,999,817 A | * | 12/1999 | Posti et al. | 455/439 |
| 6,047,007 A | * | 4/2000 | Munday et al. | 370/545 |
| 6,058,115 A | * | 5/2000 | Sawyer et al. | 370/401 |
| 6,061,566 A | * | 5/2000 | Friman | 455/445 |
| 6,101,395 A | * | 8/2000 | Keshavachar et al. | 455/466 |
| 6,108,560 A | * | 8/2000 | Navaro et al. | 455/517 |
| 6,125,120 A | * | 9/2000 | Lehtimaki | 370/435 |
| 6,134,242 A | * | 10/2000 | Aftelak | 370/465 |
| 6,138,020 A | * | 10/2000 | Galyas et al. | 455/436 |
| 6,138,037 A | * | 10/2000 | Jaamies | 455/560 |

FOREIGN PATENT DOCUMENTS

| | | |
|---|---|---|
| DE | 197 13 164 A1 | 11/1997 |
| FI | 100213 b | 9/1996 |
| WO | WO 98/15152 A1 | 4/1998 |

* cited by examiner

Primary Examiner—Daniel Hunter
Assistant Examiner—Pablo Tran
(74) Attorney, Agent, or Firm—Squire Sanders & Dempsey LLP

(57) ABSTRACT

The present invention relates to a mobile communication system comprising a rate adaptation unit (TC) which communicates with a base station system via first data transmission channels (Ater1–Ater4) and with a mobile services switching center (MSC) via second data transmission channels (A1–A4). To enable available data transmission capacity to be utilized as flexibly as possible, the base station system comprises: allocation means (7) which keep a record of the first data transmission channels (Ater1–Ater4) and which are responsive to a message sent by the mobile services switching center (MSC) for allocating one or more free first data transmission channels (Ater2, Ater4) for the call, and transmission means (8) which are arranged to send the mobile services switching center (MSC) a message which indicates which second data transmission channel (A2) the rate adaptation unit (TC) selects for the call when the allocation means (7) have allocated one or more first data transmission channels (Ater2, Ater4) for the call.

5 Claims, 2 Drawing Sheets

METHOD FOR ALLOCATING CHANNELS

Figure 1:
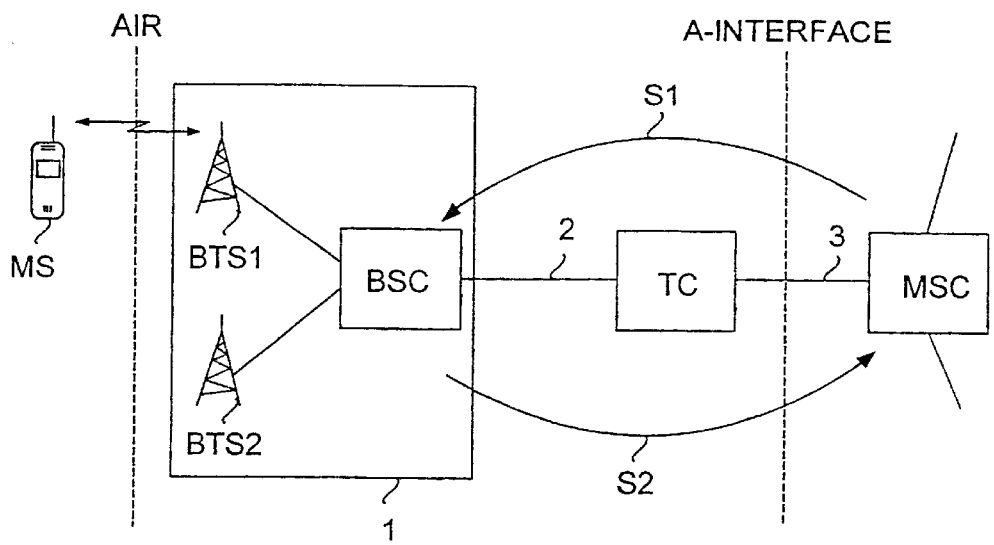

This appn is a con't of PCT/FI99/00003 filed Jan. 4, 1999.

The present invention relates to a method for allocating and selecting data transmission channels for use between a base station system and a mobile services switching centre in connection with call establishment in a mobile communication system in which a rate adaptation unit is arranged on a data transmission connection between the mobile services switching centre and the base station system, the rate adaptation unit communicating with the base station system via-first data transmission channels and with the mobile services switching centre via second data transmission channels. The invention further relates to a mobile communication system comprising a mobile services switching centre, a base station system, and a rate adaptation unit which communicates with the base station system via first data transmission channels and with the mobile services switching centre via second data transmission channels, and which comprises means for transmitting telecommunication signals associated with a given call between the mobile services switching centre and the base station system.

The present invention relates to call establishment, and particularly to establishing a data transmission connection between a base station system and a mobile services switching centre particularly in a digital mobile communication system in which a rate adaptation unit is arranged between the mobile services switching centre and the base station system.

In the present application, the concept "base station system" refers to the totality formed by base stations and their control means, i.e. a base station controller. In the present application, the concepts "call" and "call establishment" refer both to common speech calls and to other telecommunication connections transmitted via a mobile communication network, such as data calls and HSCSD (High Speed Circuit Switched Data) data calls.

The frequency spectrum required by a digital mobile communication system, such as a GSM (Global System for Mobile communications) system, for instance, is dependent on the transfer-rate used on a radio path. The higher the transfer rate used on the radio path, the broader the spectrum needed. Consequently, speech encoding of a fixed PSTN/ISDN (Public Switched Telephone Network/Integrated Services Digital Network) by which digital encoded data is transmitted 64 kbit/s per each traffic channel, is not usually suitable for use on the radio path. Hence, instead of the speech encoding of the fixed network, RPE-LTP (Regular Pulse Excitation—Long Term Prediction) speech encoding is used on a radio path in the GSM system, for example.

It is thus necessary to provide a rate adaptation unit (transcoder) between a base station system and a mobile services switching centre for adapting, for instance, different data transfer rates to each other. In other words, for instance in the GSM system, transcoder interfaces are 64 kbit/s towards the mobile services switching centre and 8 or 16 kbit/s towards the base station system.

In connection with a common full rate call of the GSM system, the mobile services switching centre allocates for a call an "Ater line" (16 kbit/s) between the base station system and the transcoder, i.e. a first data transmission channel, and an A interface line (64 kbit/s) between the transcoder and the mobile services switching centre, i.e. a second data transmission channel. In connection with common calls, one Ater line is thus allocated for one A interface line.

The need to produce quicker data transmission connections has led to the fact that the data transfer capacity of a single Ater line between a base station system and a rate adaptation unit is not sufficient. Additional capacity can be provided for instance in connection with an HSCSD data call in such a manner that several Ater lines are allocated for a call, and the Ater lines are combined by utilizing multiplexing and demultiplexing performed at the rate adaptation unit with one A interface line whose data transfer capacity for instance in the GSM system corresponds to the capacity of four Ater lines. The problem then presented is, however, that in a solution of this kind the mobile services switching centre does not always know which Ater lines are already in use, since it only has information on the A interface lines in use. Consequently, it is possible that the mobile services switching centre makes an allocation which leads to a situation in which two calls try to utilize the same Ater line simultaneously.

An object of the present invention is to solve the problem described above by providing a solution for allocating data transmission channels between a base station system and a mobile services switching centre so as to enable the data transfer capacity available to be entirely utilized as flexibly as possible, which solution enables allocation of a single data transmission channel for two calls simultaneously to be avoided. This object can be achieved by the method of the invention, characterized in that the method comprises steps of: storing selection information in the base station system and in the rate adaptation unit on which second data transmission channel the rate adaptation unit should allocate for a call for which a given first data transmission channel or channels are allocated, receiving a message which describes the type of a call to be established from the mobile services switching centre, allocating a number of free first data transmission channels required by the call type, determining by means of the selection information which second data transmission channel the rate adaptation unit selects for use, and transmitting information to the mobile services switching centre about the second data transmission channel the rate adaptation unit will select for use.

The invention further relates to a mobile communication system in which the method of the invention can be utilized. The mobile communication system of the invention is characterized in that the base station system comprises: allocation means which keep a record of the first data transmission channels and which are responsive to a message sent by the mobile services switching centre in connection with call establishment for allocating for said call one or more free first data transmission channels required by the call type of the call to be established, and transmission means which are arranged to send the mobile services switching centre on the basis of information stored in the base station system a message which indicates to the mobile services switching centre which second data transmission channel the rate adaptation unit will select for the call when the allocation means have allocated one or more first data transmission channels for the call.

The invention is based on realizing that allocating and managing data transmission channels between a base station and a mobile services switching centre becomes considerably easier and more flexible when channel allocations are carried out by the base station system. In practice, allocation is performed by a base station controller which is aware of those Ater lines which are free at a given moment. Since information is also stored in the base station controller on which A interface line, i.e. second data transmission channel, a rate adaptation unit selects for the Ater lines selected for use, the base station controller is able to transmit the information on the A interface line to be allocated for the call to the mobile services switching centre. Consequently, it is sufficient that the mobile services switching centre informs the base station controller of the type of the call to be established in connection with call establishment. On the basis of the call type indicated to the base station controller, it is able to infer the number of Ater lines needed and to allocate the necessary free Ater lines, and furthermore, to send a message to the mobile services switching centre to indicate the A interface line via which telecommunication signals associated with the call are transmitted between the rate adaptation unit and the mobile services switching centre.

Hence, the most significant advantages afforded by the solution of the invention are that available data transmission channels can be managed in a simple and flexible manner, that first data transmission channels can be utilized as efficiently as possible, and that second data transmission channels can be successfully managed in all situations independently of the type of a call to be established.

The preferred embodiments of the mobile communication system of the invention are disclosed in the attached independent claims 3 to 5.

Figure 2:
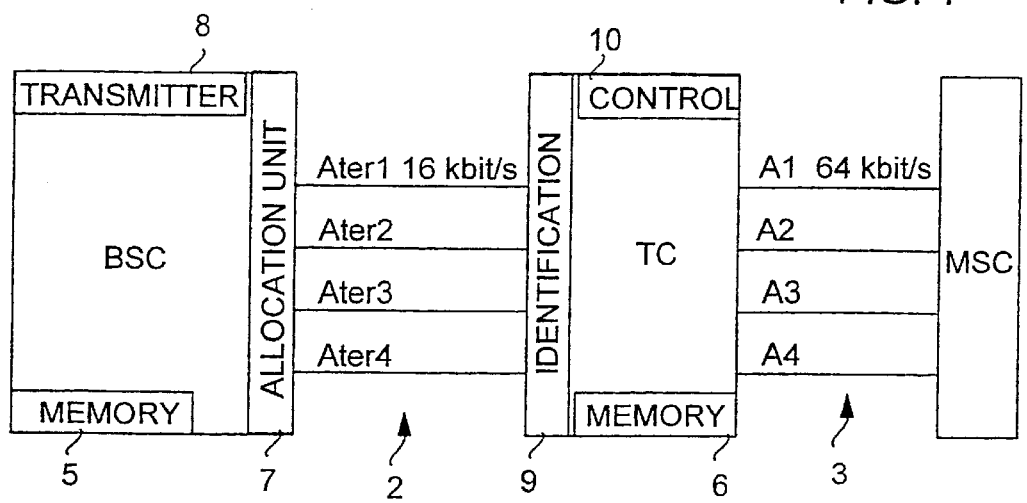
Figure 3:
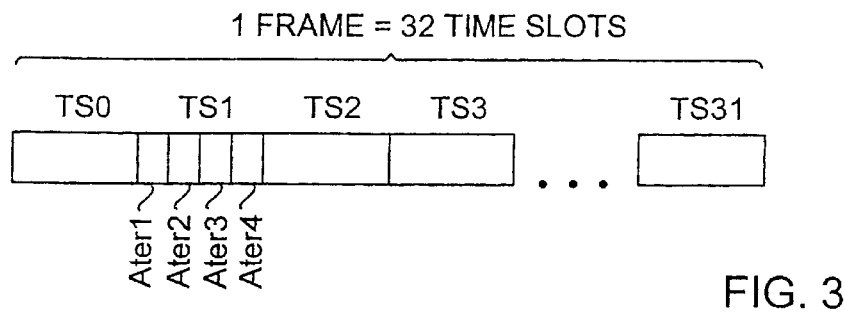
Figure 4:
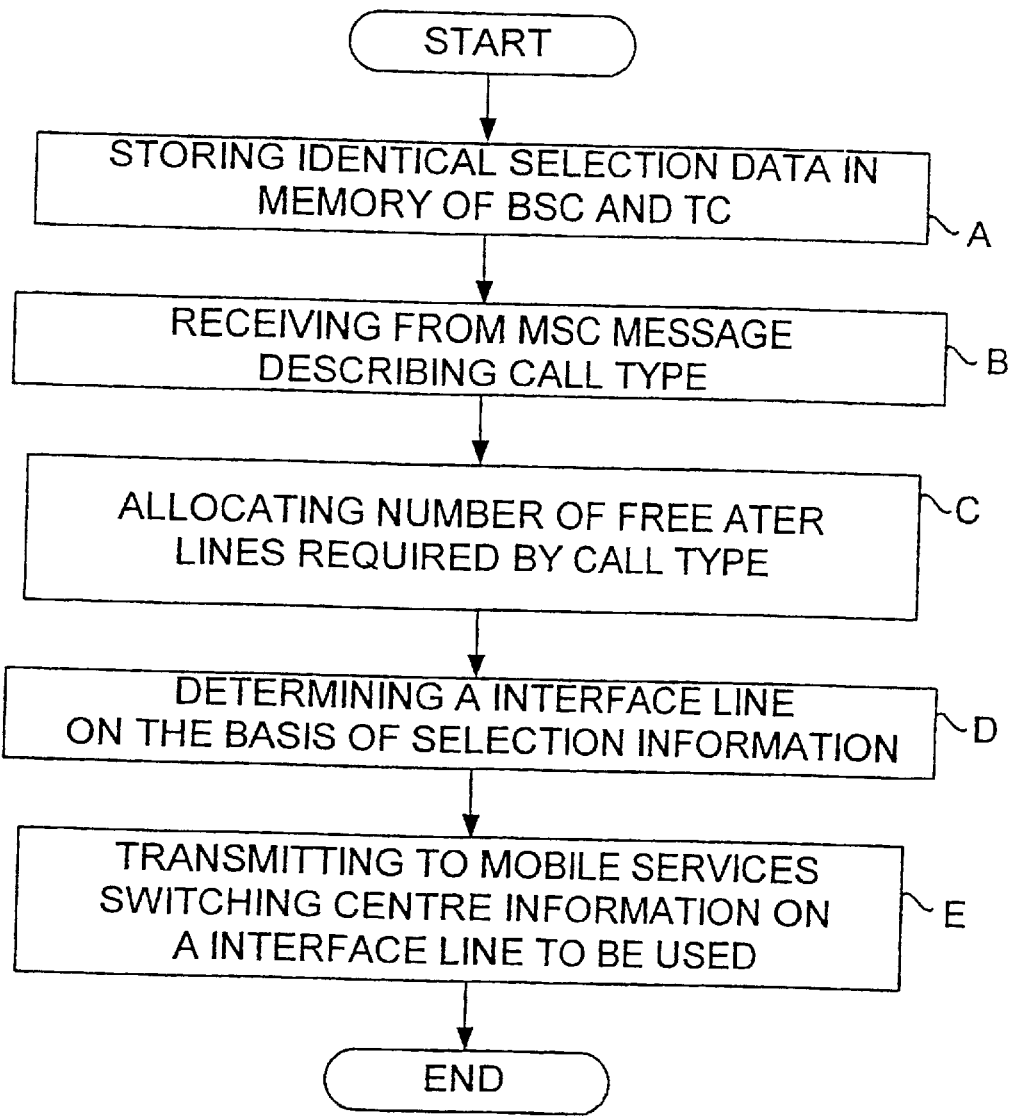

The invention will be described in closer detail in the following by way of example with reference to the accompanying drawings, in which FIG. 1 shows a block diagram of a first embodiment of a mobile communication system of the invention, FIGS. 2 and 3 illustrate data transmission connections 2 and 3 of FIG. 1, and FIG. 4 shows a flow diagram of a first embodiment of the method in accordance with, the invention.

FIG. 1 shows a block diagram of a first embodiment of a mobile communication system of the invention. The mobile communication system shown in FIG. 1 can be a GSM system, for example.

A mobile station MS of FIG. 1 communicates with a base station BTS1 which belongs to a base station system 1 via a radio path over a radio interface AIR. From the base station BTS1, telecommunication signals of the mobile station MS which are associated with a call are transmitted through a base station controller BSC to a rate adaptation unit TC via a data transmission connection 2. The rate adaptation unit TC, in turn, communicates with a mobile services switching centre MSC via a data transmission connection 3, whereby the signals of the mobile station MS associated with the call can be transmitted from the mobile station all the way to the mobile services switching centre.

The data transmission connections 2 and 3 consist of circuit switched PCM (Pulse Code Modulation) connections from which a timeslot or part of a timeslot has been allocated for each call. The data transmission connections 2 and 3 are described in closer detail in connection with FIGS. 2 and 3.

In accordance with the invention, the base station controller BSC which belongs to the base station system 1 is responsible for the allocation of telecommunication channels required for a call to be established from the data transmission connections 2 and 3. This is performed in such a manner that in connection with call establishment, the mobile services switching centre MSC sends the base station controller BSC a message S1 by which it indicates the type of the call to be established. The message is sent for instance in an ASSIGNMENT message which the mobile services switching centre would send in any case to the base station controller in connection with call establishment. The base station controller BSC keeps a record of the free channels of the data transmission connection 2, so it can allocate a number of channels required by the call type in question from the data transmission connection 2. The base station controller also knows which channel the rate adaptation unit TC selects from the data transmission connection between it and the mobile services switching centre, in which case it can indicate the channel of the data transmission connection 3 on which the telecommunication signals associated with the call will be transmitted to the mobile services switching centre by a message S2 sent to the mobile services switching centre.

FIGS. 2 and 3 illustrate the data transmission connections 2 and 3 of FIG. 1. FIG. 3 illustrates a frame structure used on the circuit switched PCM connections 2 and 3. A frame consists of 32 timeslots TS0 . . . TS31, each having a 64 kbit/s data transmission capacity.

Since telecommunication signals are transmitted from the base station controller BSC at a rate of 16 kbit/s in connection with a full rate call of a GSM system mobile station, the 64 kbit/s timeslots between the rate adaptation unit and the base station controller BCS are divided into sub-timeslots called Ater lines. One timeslot, illustrated in connection with a timeslot TS1, comprises four Ater1 . . . Ater4 Ater lines, i.e. first telecommunication channels.

The telecommunication signals associated with the full rate call are transmitted from the rate adaptation unit TC to the mobile services switching centre MSG by A interface lines A1 to A4 whose data transfer capacity is 64 kbit/s. One A interface line thus occupies one PCM timeslot entirely.

In accordance with the invention, the same selection information is stored in a memory 5 of the base station controller and in a memory 6 of the rate adaptation unit, and on the basis of the selection information is determined via which A interface line telecommunication signals associated with a given call should be forwarded to the mobile services switching centre when given Ater lines have been allocated for the call. In other words, the selection information can consist of a table indicating that, for instance

| When selected | Should be selected |
| --- | --- |
| Ater1 | A1 |
| Ater2 | A2 |
| Ater2 & Ater4 | A2 |
| Ater3 & Ater4 | A3 |
| Ater 1–3 | A1 |
| Ater 1 & 2 & 4 | A1 |

It is to be noted that the table shown above by way of example is not complete; in practice, the table can comprise an A interface line to be selected for all possible Ater line combinations. It is essential that the information stored in the base station controller and the rate adaptation unit is identical, in which case it is sufficient that an allocation unit 7 of the base station controller allocates the Ater lines, whereupon a transmitter 8 can send the mobile services switching centre a message S2 which indicates the A interface line by which the call is transmitted.

When the allocation unit 7 has allocated the Ater lines for instance for an HSCSD call requiring two Ater lines, it informs the rate adaptation. unit TC of the allocation. This is performed in such a manner that the allocation unit 7 transmits a given bit pattern on the allocated Ater lines. The allocation unit 7 can signal a free Ater line to the rate adaptation unit for instance by transmitting a bit pattern 01B on the Ater line in question. The allocation unit 7 can signal a coming two-Ater-line call to the rate adaptation unit for instance by transmitting a bit pattern 10B on the Ater lines in question. The allocation unit 7 can signal a coming three-Ater-line call to the rate adaptation unit for instance. by transmitting a bit pattern 11B on the Ater lines in question, etc.

Alternatively, the allocation unit 7 can, for instance, signal a coming three-Ater-line call to the rate adaptation unit by transmitting a predetermined bit sequence only on one of the Ater lines which will be used. The bit sequence in question thus indicates the other Ater lines which will be used to the rate adaptation unit.

An identification unit 9 of the rate adaptation unit TC monitors continuously the Ater lines, thus being able to identify bit patterns transmitted on the lines. Hence, when it for instance detects the bit pattern 10B on lines Ater2 and Ater4, it informs a control unit 10 of this. The control unit then finds out, on the basis of the selection information in the memory 6, on which A interface line the two-Ater-line call in question should be forwarded. According to the above table, the correct A interface line is A2. The control unit 10 thus activates the rate adaptation unit to start forwarding the telecommunication signals received from the Ater lines Ater2 and Ater4 via the A interface line A2 (after necessary rate adaptation procedures known per se). Signals are thus transmitted until the identification unit detects the bit pattern 01B on the Ater lines Ater2 and Ater4 (free line=call terminated), whereby the rate adaptation unit TC stops transmitting signals.

FIG. 4 shows a flow diagram of a first embodiment of the method in accordance with the invention. In block A, identical selection information is stored in a base station controller BSC and a rate adaptation unit, the selection information indicating which A interface line should be selected for a call for which given Ater lines are allocated.

In block B, a message which describes the type of the call is received from a mobile services switching centre in connection with call establishment. The mobile services switching centre can send this message in connection with an ASSIGNMENT message, for example.

In block C, a number of free Ater lines required by the call type is allocated. In other words, if the call is a two-time-slot HSCSD call, two Ater lines are allocated. Next, the same given bit pattern is transmitted via the allocated Ater lines, the bit pattern indicating to the rate adaptation unit that the Ater lines in question are allocated for the same call. Consequently, the rate adaptation unit is able to find out on which A interface line it should start transmitting the telecommunication signals associated with the call.

In block D, the A interface line to be used is found out on the basis of the selection information and the allocated Ater lines.

In block E, the mobile services switching centre is informed of the A interface line to be used. In this stage, the telecommunication channels between the base station system and the mobile services switching centre which are associated with the call are selected, and the call establishment can be continued in a manner known per se.

It is to be understood that the above description and the accompanying drawings are only intended to illustrate the present invention. It will be obvious to those skilled in the art that the invention can be varied and modified in many ways without departing from the scope and spirit of the invention disclosed in the attached claims.

What is claimed is:

1. A method for allocating and selecting data transmission channels for use between a base station system and a mobile services switching centre in connection with call establishment in a mobile communication system in which a rate adaptation unit is arranged on a data transmission connection between the mobile services switching centre and the base station system, the rate adaptation unit communicating with the base station system via first data transmission channels and with the mobile services switching centre via second data transmission channels, comprising:

storing selection information in the base station system and in the rate adaptation unit on which second data transmission channel the rate adaptation unit should allocate for a call for which a given first data transmission channel or channels are allocated;

receiving a message which describes the type of a call to be established from the mobile services switching centre;

allocating a number of free first data transmission channels required by the call type;

determining by means of the selection information which second data transmission channel the rate adaptation unit selects for use; and transmitting information to the mobile services switching centre about the second data transmission channel the rate adaptation unit will select for use.

2. A mobile communication system, comprising:

a mobile services switching centre;

a base station system; and a rate adaptation unit, which communicates with the base station system via first data transmission channels and with the mobile services switching centre via second data transmission channels, and which transmits telecommunication signals associated with a call between the mobile services switching center and a base system;

wherein the base station system:

keeps a record of the first data transmission channels, responds to a message sent by the mobile services switching centre in connection with call establishment by allocating for the call one or more free first data transmission channels required by the call type of the call to be established, and transmits to the mobile services switching centre, on the basis of information stored in the base station system, a message which indicates to the mobile services switching centre which second data transmission channel the rate adaptation unit will select for the call when one or more first data transmission channels have been allocated for the call.

3. A mobile communication system as claimed in claim 2, wherein the rate adaptation unit:

has a memory in which selection information is stored indicating the second data transmission channel the rate adaptation unit should select for the call for which the base station system has allocated the first data transmission channels;

monitors the first data transmission channels to identify the first data transmission channels allocated for the call by the base station system;

selects one of the second data transmission channels for the call on the basis of information stored in the rate adaptation unit memory when the rate adaptation unit has identified the first data transmission channels allocated for the call; and transmits telecommunication signals associated with the call between the allocated first data transmission channels and the selected second data transmission channel.

4. A mobile communication system as claimed in claim 2, wherein the base station system informs the rate adaptation unit of the allocated first data transmission channels by transmitting to the rate adaptation unit a predetermined bit pattern on the allocated first data transmission channels in connection with call establishment.

5. A mobile communication system as claimed claim 2, wherein the mobile communication system is a GSM system, the rate adaptation unit includes a transcoder, and a base station controller allocates the first data transmission channels for the call and transmits to the mobile services switching centre a message which indicates to the mobile services switching centre which second data transmission channel the rate adaptation unit will select for the call.

\* \* \* \* \*